(12) United States Patent
Sato et al.

(10) Patent No.: US 8,292,992 B2
(45) Date of Patent: Oct. 23, 2012

(54) FLUE GAS DESULFURIZATION APPARATUS

(75) Inventors: Toshihiro Sato, Nagasaki (JP); Manabu Oda, Nagasaki (JP); Koichiro Iwashita, Hiroshima (JP); Eiji Ochi, Hiroshima (JP); Susumu Okino, Hiroshima (JP); Takeo Shinoda, Austin, TX (US); Tetsu Ushiku, Austin, TX (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 729 days.

(21) Appl. No.: 12/021,666

(22) Filed: Jan. 29, 2008

(65) Prior Publication Data

US 2009/0188393 A1    Jul. 30, 2009

(51) Int. Cl.
*B01D 47/00* (2006.01)
(52) U.S. Cl. ............... 96/244; 96/356; 96/357; 96/358
(58) Field of Classification Search .......... 95/216, 95/235, 221–222; 96/300, 355–358
See application file for complete search history.

(56) References Cited

U.S. PATENT DOCUMENTS

| | | | | |
|---|---|---|---|---|
| 4,157,250 A | * | 6/1979 | Regehr et al. | 96/299 |
| 4,204,847 A | * | 5/1980 | Ko | 96/356 |
| 4,263,099 A | * | 4/1981 | Porter | 201/39 |
| 5,421,861 A | * | 6/1995 | Gohara et al. | 95/235 |
| 5,512,072 A | * | 4/1996 | Laslo | 96/234 |
| 5,662,721 A | * | 9/1997 | Bresowar | 96/356 |
| 5,958,306 A | * | 9/1999 | Curtis | 261/30 |
| 6,083,302 A | * | 7/2000 | Bauver et al. | 95/216 |
| 6,315,804 B1 | * | 11/2001 | Bradley | 55/440 |
| 6,432,367 B1 | * | 8/2002 | Munk | 422/171 |
| 6,896,851 B1 | * | 5/2005 | Onizuka et al. | 422/168 |
| 2001/0000725 A1 | * | 5/2001 | Shinoda et al. | 422/172 |
| 2001/0054354 A1 | * | 12/2001 | Baudat et al. | 95/214 |

FOREIGN PATENT DOCUMENTS

| | | | |
|---|---|---|---|
| JP | 07317039 A | * | 12/1995 |
| JP | 2005-199184 A | | 7/2005 |
| JP | 2006-255629 A | | 9/2006 |
| JP | 3829976 B2 | | 10/2006 |
| JP | 2007-278858 | * | 10/2007 |

* cited by examiner

*Primary Examiner* — Duane Smith
*Assistant Examiner* — Ives Wu
(74) *Attorney, Agent, or Firm* — Westerman, Hattori, Daniels & Adrian, LLP

(57) ABSTRACT

A flue gas desulfurization apparatus includes an absorption tower that absorbs sulfur oxide in a flue gas, and drift suppression members that are arranged near a bend portion of a purified gas exhaust passage arranged at an outlet portion of the absorption tower, the drift suppression members serving to collect mist particles.

7 Claims, 16 Drawing Sheets

FLUE GAS DESULFURIZATION APPARATUS

BACKGROUND OF THE INVENTION

1. Field of the Invention

The invention relates to flue gas desulfurization apparatuses for absorbing sulfur oxides in flue gases and cleaning up the flue gases.

2. Description of the Related Art

Conventionally, a flue gas desulfurization apparatus has been proposed, for example, for flue gas treatment in thermal power plants and the like. An example of the conventional flue gas desulfurization apparatuses is shown in FIG. 13.

As shown in FIG. 13, a flue gas desulfurization apparatus 100 includes an inlet-side absorption tower 102 having an opening 102a in an upper portion for taking in an untreated flue gas 101, an outlet-side absorption tower 104 having an opening 104b in an upper portion for discharging a treated purified gas 103, and the inlet-side absorption tower 102 and the outlet-side absorption tower 103 are arranged next to each other. In each of the absorption towers 102 and 104, plural spray pipes 106 are arrange parallel to each other in a horizontal direction. The spray pipe 106 has plural nozzles 105 disposed at predetermined intervals. Each spray pipe 106 is connected to a circulation pump 108 which supplies absorption slurry 107 to the spray pipe 106.

The flue gas 101 introduced into the inlet-side absorption tower 102 from the opening 102a flows downward, passes through a space 110 in a reservoir 109 which communicates the inlet-side absorption tower 102 and the outlet-side absorption tower 104 with each other, and thereby moves from the inlet-side absorption tower 102 to the outlet-side absorption tower 104. Thereafter, the flue gas 101 flows inside the outlet-side absorption tower 104 upward. When the absorption slurry 107 is ejected upward from each of the nozzles 105 like a liquid column while the flue gas 101 moves through the absorption tower 102 downward and through the absorption tower 104 upward, the liquid-column-like absorption slurry 107 is brought into contact with the flue gas 101, thereby absorbing sulfur oxides contained in the flue gas 101. The treated purified gas 103 passes through an exhaust passage 104a in the outlet-side absorption tower 104 and is discharged from the opening 104b. The absorption slurry 107 is processed into plaster or the like in a separate sulfate treatment facility 113 (see, for example, Japanese Patent Application Laid-Open No. 2006-255629).

On the outlet side of the outlet-side absorption tower 104 of the flue gas desulfurization apparatus 100, mist eliminators 112A and 112B are disposed as shown in FIG. 14 to prevent dispersion of the purified gas 103 and a mist 114. However, a mist of a small particle diameter (for example, a mist of a submicron order not more than a few μm) can pass through the mist eliminators 112A and 112B and disperse.

In addition, since an outlet portion of the outlet-side absorption tower 104 has a bend portion R so that the outlet-side absorption tower 104 can be connected to a stack which discharges the purified gas 103, a drift occurs around the mist eliminators 112A and 112B.

When there is a drift, a gas flow of a flow rate equal to or higher than a limit flow rate of the mist eliminators 112A and 112B can be generated locally (particularly at the side of an inside corner) to make the mist 114 disperse.

Particularly when the opening 104b connected to the stack side has a small section area, an amount of the drift increases.

SUMMARY OF THE INVENTION

It is an object of the present invention to at least partially solve the problems in the conventional technology.

More particularly, an object of the invention is to provide a flue gas desulfurization apparatus which can suppress the drift and improve mist collection efficiency.

A flue gas desulfurization apparatus according to one aspect of the present invention includes an absorption tower that absorbs sulfur oxide in a flue gas, and drift suppression members that are arranged near a bend portion of a purified gas exhaust passage arranged at an outlet portion of the absorption tower, the drift suppression members serving to collect mist particles.

According to another aspect of the present invention, in the flue gas desulfurization apparatus, the drift suppression members may be resisting members.

According to still another aspect of the present invention, in the flue gas desulfurization apparatus, the drift suppression members may be resisting members, and the resisting members may be arranged at a downstream side of a mist eliminator, at an upstream side of the bend portion, and at a side of an inside corner of the bend portion.

According to still another aspect of the present invention, in the flue gas desulfurization apparatus, the drift suppression members may be resisting members, and the resisting members may be formed as laminated members each including two portions, and at least one of the two portions is slidable against another portion of the two portions.

According to still another aspect of the present invention, in the flue gas desulfurization apparatus, the drift suppression members may be resisting members, and the resisting members may have sectional shapes of at least one of a round shape, rectangular shape, H-shape, I-shape, L-shape, and a semicircular-arch-like shape.

According to still another aspect of the present invention, in the flue gas desulfurization apparatus, the drift suppression members may be arranged on at least one of an upstream side and a downstream side of a mist eliminator.

According to still another aspect of the present invention, in the flue gas desulfurization apparatus, the drift suppression member may have a cavity and a mist reservoir for collecting mist water.

According to still another aspect of the present invention, in the flue gas desulfurization apparatus, the drift suppression member may have a cavity and a mist reservoir for collecting mist water, and an umbrella-like collecting plate for collecting a mist.

According to still another aspect of the present invention, in the flue gas desulfurization apparatus, the drift suppression member may have plural small holes for collecting a mist, and a cavity and a mist reservoir for collecting mist water.

According to still another aspect of the present invention, in the flue gas desulfurization apparatus, the drift suppression member may be a damper member having a vane at least on one side.

According to still another aspect of the present invention, in the flue gas desulfurization apparatus, the drift suppression member may have a mist sensor for measuring a mist in a purified gas.

According to still another aspect of the present invention, the flue gas desulfurization apparatus may further include a mist sensor that is arranged inside the purified gas exhaust passage to measure a mist in the purified gas.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail below with reference to the accompanying drawings. The present invention, however, is not limited to the embodiments. Elements described in the following description of the embodiments may include those readily conceived by those skilled in the art or may include those substantially equivalent to those readily conceived by those skilled in the art.

First Embodiment

A flue gas desulfurization apparatus according to a first embodiment of the present invention will be described with reference to the accompanying drawings.

Figure 1A:
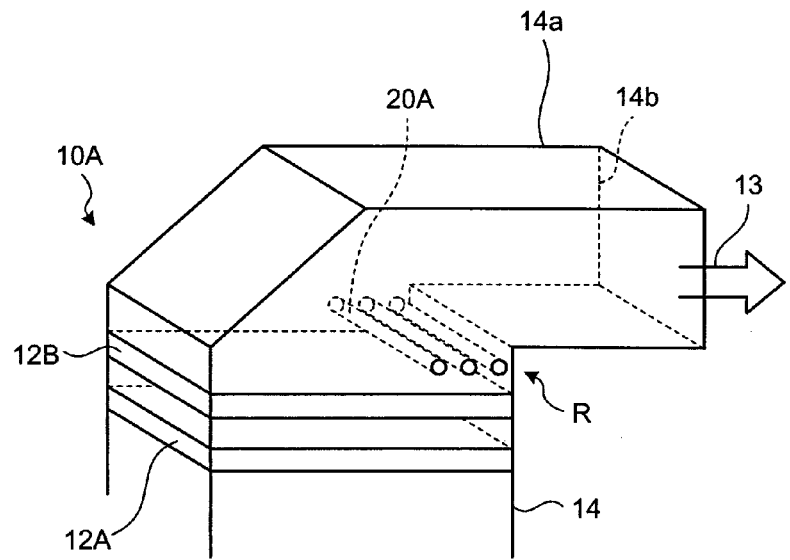
FIG. 1A is a schematic diagram of a flue gas desulfurization apparatus according to a first embodiment.

FIG. 1A is a schematic diagram of a main portion of the flue gas desulfurization apparatus according to the first embodiment.

As shown in FIG. 1A, a flue gas desulfurization apparatus 10A of the first embodiment is a flue gas desulfurization apparatus including an absorption tower for absorbing sulfur oxides in a flue gas, wherein plural (round) resisting members 20A having a round section are arranged as drift suppression members near a bend portion R of an exhaust passage 14a arranged near an outlet portion of an absorption tower 14 for a purified gas 13.

In the first embodiment, plural (round) resisting members 20A are arranged at a downstream side of mist eliminators 12A and 12B. Specifically, the plural (round) resisting members 20A are arranged locally at the bend portion R, more specifically, locally within an area occupying not more than approximately 50% of the bend portion R from an inside corner.

In the first embodiment, the (round) resisting members 20A are arranged at the downstream side of the mist eliminator 12B immediately before the flowing gas reaches the bend portion R, whereby a drift suppressing effect on the purified gas 13 is further enhanced.

Figure 1B:
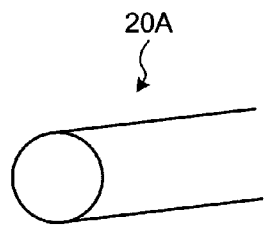
FIG. 1B is a perspective view of a resisting member according to the first embodiment.

FIG. 1B is a perspective view of the (round) resisting member 20A according to the first embodiment.

According to the first embodiment, the (round) resisting members 20A are arranged at the side of the inside corner where the flow rate is high at the downstream side of the mist eliminator 12B to cause pressure drop and suppress the drift.

An opening ratio of the (round) resisting members 20A may be determined according to the strength of a drift. The opening ratio is, for example, approximately 20 to 50%.

In the first embodiment, the resisting member is a round shape member. The present invention, however, is not limited thereto. The resisting member can be, for example, a member with a polygonal section (such as a dodecagonal section and a decagonal section) or a member with a polygonal section with a shape extremely close to that of the round member.

When the (round) resisting members 20A are arranged, the drift can be suppressed and the distribution of flow rate of the purified gas can be adjusted within a predetermined performance range of the mist eliminators 12A and 12B, whereby the dispersing mists can be significantly reduced.

As a result, the section area of an opening 14b of the exhaust passage 14a, which serves to lead the purified gas 13 to the stack for discharge, can be reduced. If the section area of the opening in the conventional apparatus is represented as 100%, the section area of the apparatus according to the first embodiment of the present invention can be made 65% to 90%. Thus, a part of the elements of the desulfurization apparatus can be made lighter, whereby a cost can be reduced.

Figure 13:
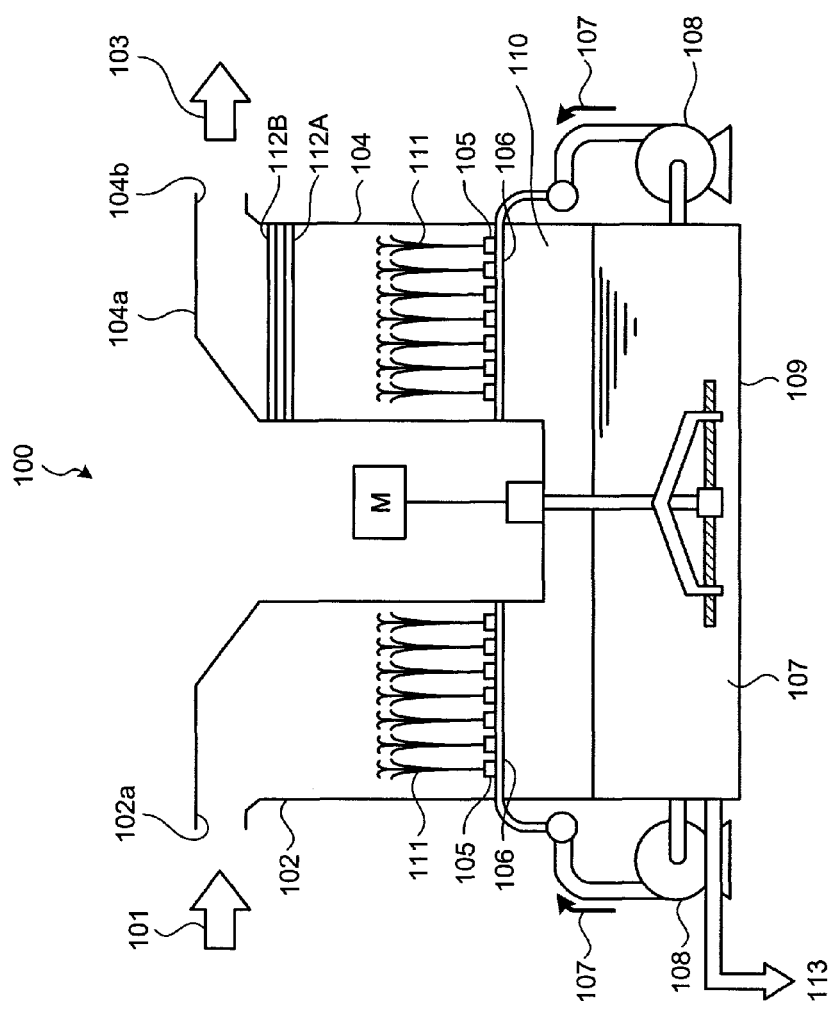
FIG. 13 is a schematic diagram of a general configuration of a flue gas desulfurization apparatus.
Figure 14:
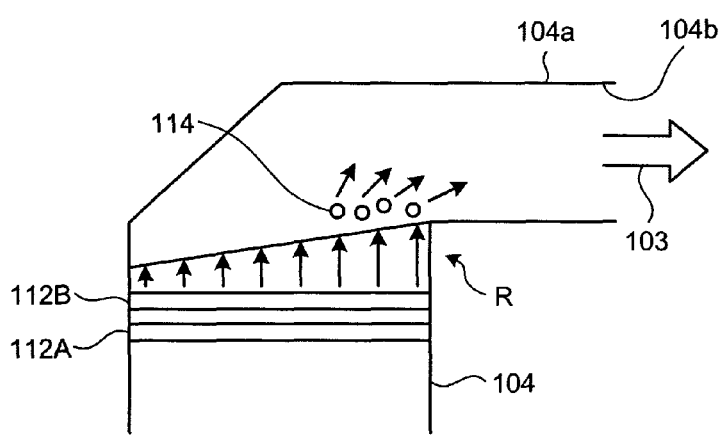
FIG. 14 is a schematic diagram of a main portion of a conventional flue gas desulfurization apparatus.

The desulfurization apparatus according to the present invention can be applied to any desulfurization apparatuses other than the desulfurization apparatus using jet slurry as described with respect to the conventional apparatus in FIG. 13.

Second Embodiment

A flue gas desulfurization apparatus according to a second embodiment of the present invention will be described with reference to the accompanying drawings.

Figure 2A:
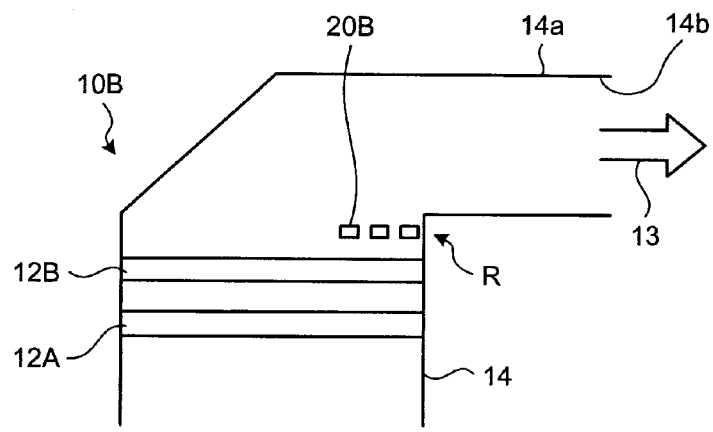
FIG. 2A is a schematic diagram of a flue gas desulfurization apparatus according to a second embodiment.

FIG. 2A is a schematic diagram of a main portion of the flue gas desulfurization apparatus according to the second embodiment.

As shown in FIG. 2A, a flue gas desulfurization apparatus 10B according to the second embodiment includes plural (rectangular) resisting members 20B having a rectangular section arranged as drift suppression members near the bend portion R of the exhaust passage 14a of the purified gas 13.

An opening ratio of the (rectangular) resisting members 20B according to the second embodiment can be adjusted through a change in the rectangular sectional shape.

Figure 2B:
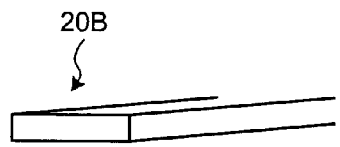
FIG. 2B is a perspective view of a resisting member according to the second embodiment.

FIG. 2B is a perspective view of the (rectangular) resisting member 20B according to the second embodiment.

According to the second embodiment, the (rectangular) resisting members 20B are arranged at the side of the inside corner where the flow rate is high at the downstream side of the mist eliminator 12B to cause pressure drop and suppress the drift.

An opening ratio of the (rectangular) resisting members 20B may be determined according to the strength of a drift. The opening ratio is, for example, approximately 20% to 50%.

In the second embodiment, the resisting member is a rectangular shape member with a rectangular section. The present invention, however, is not limited thereto. The resisting member can be, for example, a member with a square section.

When the (rectangular) resisting members 20B are arranged, the drift can be suppressed and the distribution of flow rate of the purified gas can be adjusted within the predetermined performance range of the mist eliminators 12A and 12B, whereby the dispersing mists can be significantly reduced.

As a result, the section area of the opening 14b of the exhaust passage 14a, which serves to lead the purified gas 13 to the stack for discharge, can be reduced. If the section area of the opening in the conventional apparatus is represented as 100%, the section area of the apparatus according to the third embodiment of the present invention can be made 65% to 90%. Thus, a part of the elements of the desulfurization apparatus can be made lighter, whereby a cost can be reduced.

Third Embodiment

A flue gas desulfurization apparatus according to a third embodiment of the present invention will be described with reference to the accompanying drawings.

Figure 3A:
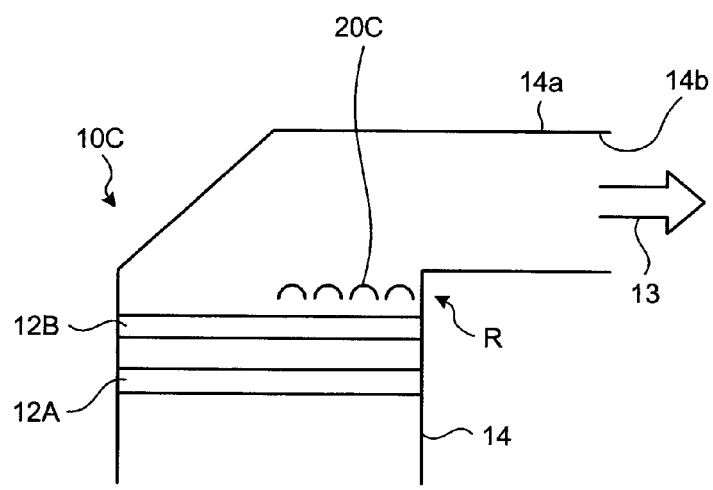
FIG. 3A is a schematic diagram of a flue gas desulfurization apparatus according to a third embodiment.

FIG. 3A is a schematic diagram of a main portion of the flue gas desulfurization apparatus according to the third embodiment.

As shown in FIG. 3A, a flue gas desulfurization apparatus 10C according to the third embodiment includes plural (semicircular-arch-like) resisting members 20C having a semicircular-arch-like section arranged as drift suppression members near the bend portion R of the exhaust passage 14a of the purified gas 13.

In the third embodiment, plural (semicircular-arch-like) resisting members 20C are arranged at a downstream side of the mist eliminators 12A and 12B. Specifically, the plural (semicircular-arch-like) resisting members 20C are arranged locally at the bend portion R, more specifically, locally within an area occupying not more than approximately 50% of the bend portion R from the inside corner.

Figure 3B:
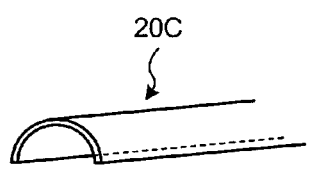
FIG. 3B is a perspective view of a resisting member according to the third embodiment.

FIG. 3B is a perspective view of the (semicircular-arch-like) resisting member 20C according to the third embodiment.

According to the third embodiment, the (semicircular-arch-like) resisting members 20C are arranged at the side of the inside corner where the flow rate is high at the downstream side of the mist eliminator 12B, to cause pressure drop and suppress the drift.

An opening ratio of the (semicircular-arch-like) resisting members 20C may be determined according to the strength of a drift. The opening ratio is, for example, approximately 20% to 50%.

When the (semicircular-arch-like) resisting members 20C are arranged, the drift can be suppressed and the distribution of flow rate of the purified gas can be adjusted within a predetermined performance range of the mist eliminators 12A and 12B, whereby the dispersing mists can be significantly reduced.

As a result, the section area of the opening 14b of the exhaust passage 14a, which serves to lead the purified gas 13 to the stack for discharge, can be reduced. If the section area of the opening in the conventional apparatus is represented as 100%, the section area of the apparatus according to the third embodiment of the present invention can be made 65% to 90%. Thus, a part of the elements of the desulfurization apparatus can be made lighter, whereby a cost can be reduced.

Further, since the section of the resisting member 20C is a semicircular-arch-like shape, fine particles or extremely fine particles of the mist in the purified gas hitting an inside of the resisting member 20C gather and form a droplet. The droplet falls on the mist eliminators 12A and 12B, whereby the mist collecting efficiency is enhanced.

Figure 4A:
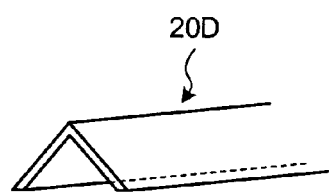
FIGS. 4A, 4B, and 4C are perspective views of modifications of the resisting member according to the third embodiment.
Figure 4B:
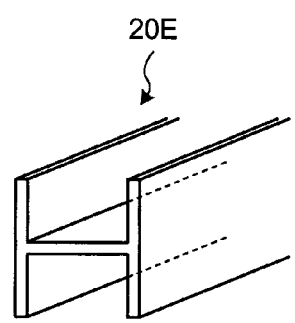
Figure 4C:
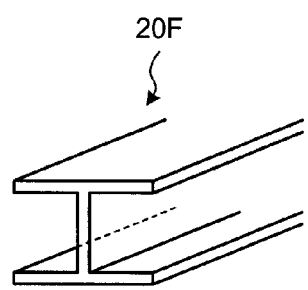

Modifications of the resisting member are shown in FIGS. 4A, 4B, and 4C.

FIG. 4A shows a (L-shaped) resisting member 20D which is a member having an L-shaped section. FIG. 4B shows a (H-shaped) resisting member 20E which is a member having an H-shaped section. FIG. 4C shows a (I-shaped) resisting member 20F which is a member having an I-shaped section.

When the diameter of the (round) resisting member 20A of FIG. 1B is represented as one, the length of one side of the L-shaped section of the (L-shaped) resisting member 20D is preferably one. Further, the horizontal to vertical ratio of the section of each of the (H-shaped) resisting member 20E and the (I-shaped) resisting member 20F is set preferably to 1:1.

If the resistance of the (round) resisting member 20A is represented as one, the ratio of resistances of the resisting members 20A, 20D, 20E, and 20F can be represented as:

20A:20D:20E:20F=1:2:1:2.

Therefore, when one of the (L-shaped) resisting member 20D and the (I-shaped) resisting member 20F is employed in place of the (round) resisting member 20A and the (H-shaped) resisting member 20E, the resistance can be increased, and the opening ratio can be increased accordingly. Thus, the amount of employed resisting members can also be reduced, which is preferable in terms of cost reduction.

Here, the (I-shaped) resisting member 20F has a high resistance because upper and lower beams parallel to each other resist the force of flow.

Fourth Embodiment

A flue gas desulfurization apparatus according to a fourth embodiment of the present invention will be described with reference to the drawings.

Figure 5A:
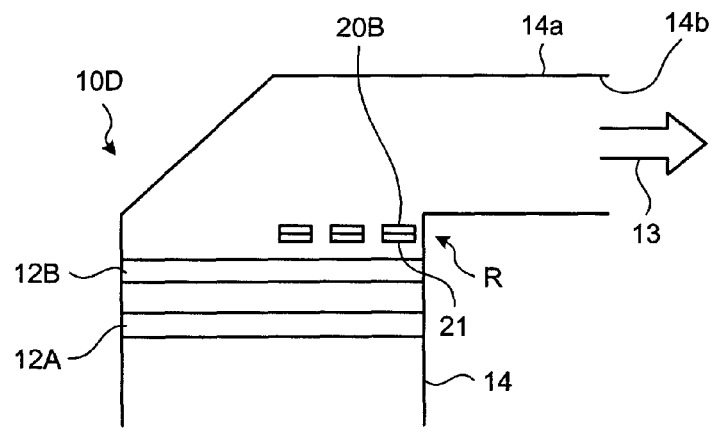
FIG. 5A is a schematic diagram of a flue gas desulfurization apparatus according to a fourth embodiment.

FIG. 5A is a schematic diagram of a main portion of the flue gas desulfurization apparatus according to the fourth embodiment.

As shown in FIG. 5A, a flue gas desulfurization apparatus 10D of the fourth embodiment is a flue gas desulfurization apparatus including an absorption tower for absorbing sulfur oxides in a flue gas, wherein plural resisting members having a laminated structure are arranged near the bend portion R of the exhaust passage 14a arranged near the outlet portion of the absorption tower 14 for the purified gas 13.

In the fourth embodiment, a mist sensor 21 of a rectangular section is arranged on a lower surface of the (rectangular) resisting member 20B, and the (rectangular) resisting member 20B is slidable against the mist sensor 21 along a horizontal direction.

Figure 5B:
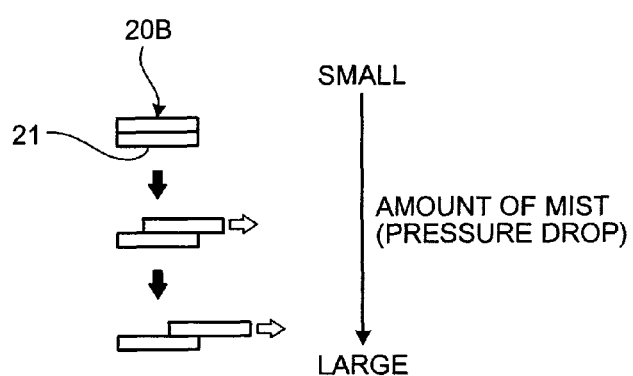
FIG. 5B is a sectional view of a resisting member according to the fourth embodiment.

FIG. 5B shows how the resisting member 20B slides against the mist sensor 21. An amount of sliding of the resisting member 20B is adjusted so that the pressure drop increases as the amount of mist detected by the mist sensor 21 increases.

Fifth Embodiment

A flue gas desulfurization apparatus according to a fifth embodiment of the present invention will be described with reference to the accompanying drawings.

Figure 6A:
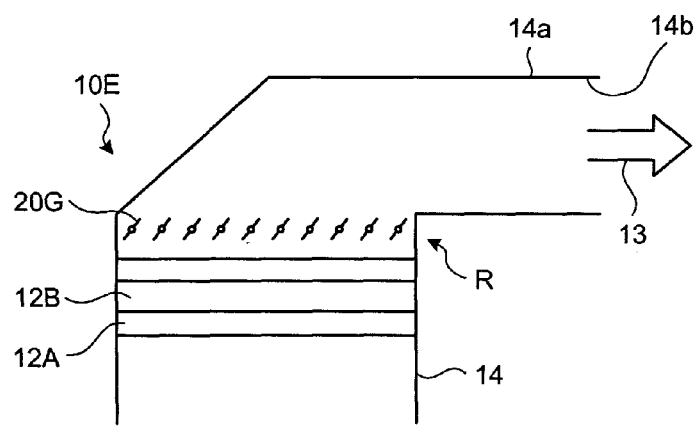
FIG. 6A is a schematic diagram of a flue gas desulfurization apparatus according to a fifth embodiment.

FIG. 6A is a schematic diagram of a main portion of the flue gas desulfurization apparatus according to the fifth embodiment.

As shown in FIG. 6A, a flue gas desulfurization apparatus 10E of the fifth embodiment is a flue gas desulfurization apparatus including an absorption tower for absorbing sulfur oxides in a flue gas, wherein plural dampers 20G are arranged as resisting members near the bend portion R of the exhaust passage 14a arranged near the outlet portion of the absorption tower 14 for the purified gas 13.

An angle of the damper which serves as the resisting member of the fifth embodiment can be adjusted at will, and hence, an opening ratio can be easily adjusted.

Figure 6B:
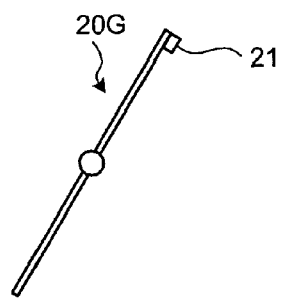
FIG. 6B is a sectional view of a resisting member according to the fifth embodiment.

Further, as shown in FIG. 6B, the mist sensor 21 is arranged on the damper 20G, so that the angle of the damper 20G is adjusted according to the amount of mist.

Further, a manner of arrangement of the damper 20G can be determined according to the strength of a drift. For example, the dampers 20G may be arranged only at the side of the inside corner of the bend portion R.

Since the damper is used as the resisting member in the fifth embodiment, the opening ratio is adjustable and the pressure drop is also easily adjustable.

Examples of arrangements of the mist sensor are shown in FIGS. 7A to 7D.

Figure 7A:
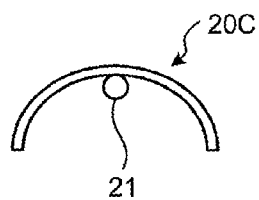
FIGS. 7A, 7B, 7C, and 7D are sectional views of modifications of the resisting member according to the fifth embodiment.

FIG. 7A is a schematic diagram of the mist sensor 21 arranged inside the (semicircular-arch-like) resisting member 20C.

Figure 7B:
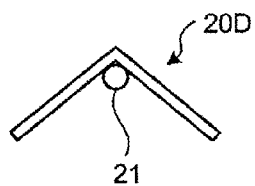

FIG. 7B is a schematic diagram of the mist sensor 21 arranged inside the (L-shaped) resisting member 20D.

Figure 7C:
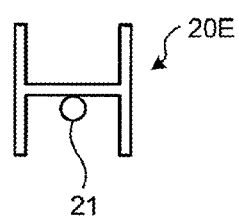

FIG. 7C is a schematic diagram of the mist sensor 21 arranged inside a horizontal beam portion of the (H-shaped) resisting member 20E.

Figure 7D:
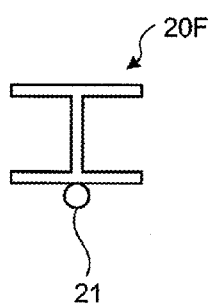

FIG. 7D is a schematic diagram of the mist sensor 21 arranged at a lower side of a lower beam portion of the (I-shaped) resisting member 20F.

The resisting member as shown in FIGS. 7A to 7D may be arranged in the flue gas desulfurization apparatus described above so that the mist monitoring and drift suppression can be realized at the same time.

Further, the mist sensor may be arranged on an inner surface of the exhaust passage 14a at the downstream side of the resisting member or a passage connected to the exhaust passage 14a at the downstream side, rather than on the resisting member. Alternatively, the mist sensors may be arranged both on the resisting member and on the inner surface of the passage so that mist concentration can be monitored more accurately for the prevention of mist dispersion.

In the above description, various types of resisting members are described. The apparatus of the present invention may include only one type of the resisting member or plural types of the resisting members.

Sixth Embodiment

A flue gas desulfurization apparatus according to a sixth embodiment of the present invention will be described with reference to the accompanying drawings.

Figure 8A:
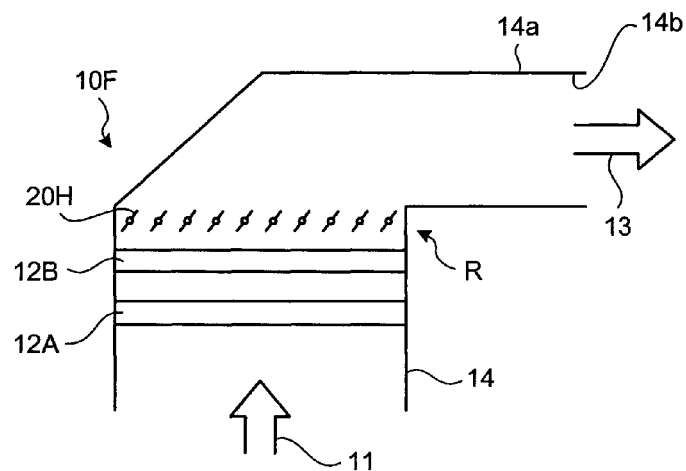
FIG. 8A is a schematic diagram of a flue gas desulfurization apparatus according to a sixth embodiment.

FIG. 8A is a schematic diagram of a main portion of the flue gas desulfurization apparatus according to the sixth embodiment.

As shown in FIG. 8A, a flue gas desulfurization apparatus 10F of the sixth embodiment is a flue gas desulfurization apparatus including an absorption tower for absorbing sulfur oxides in a flue gas, wherein plural drift suppression members 20H having a collecting portion 24 for collecting mist particles are arranged near the bend portion R of the exhaust passage 14a arranged near the outlet portion of the absorption tower 14 for the purified gas 13.

Figure 8B:
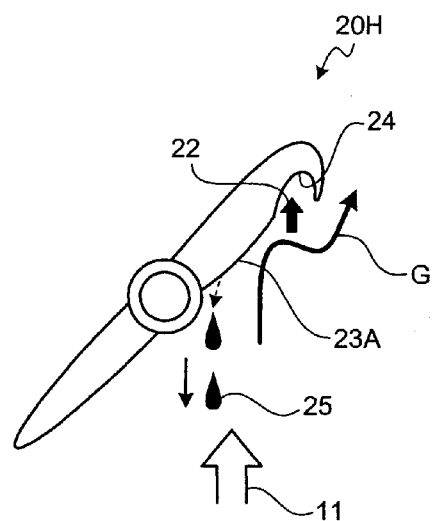
FIG. 8B is a schematic diagram of a drift suppression member according to the sixth embodiment.

The drift suppression member 20H according to the sixth embodiment serves to collect the mist particles as follows. As shown in FIG. 8B, when a gas flow G hits on a back surface side of a collecting vane 23A, a mist flow 22 advances straight and hits the collecting portion 24 which curves so as to form a downward-facing opening. The mist flow 22 then condenses on a lower surface of the collecting vane 23A to become mist water 25 which eventually falls off. With such an arrangement, the mist collecting efficiency can be improved.

In the sixth embodiment, plural drift suppression members 20H are arranged at the downstream side of the mist eliminators 12A and 12B arranged in two stages. The present invention, however, is not limited to such an arrangement. For example, the drift suppression members 20H may be arranged at one of the upstream side and the downstream side of the mist eliminators, or both at the upstream side and the downstream side.

When the mist eliminators are arranged in plural stages, the drift suppression members 20H may be arranged between the stages of the mist eliminators.

Further, the drift suppression member 20H may be a fixed element or a damper-type element which can be opened/closed.

Further, a mist sensor may be arranged in a part of the drift suppression member for measuring a mist concentration, and the degree of opening/closing of the drift suppression member may be adjusted according to the measured mist concentration.

Figure 8C:
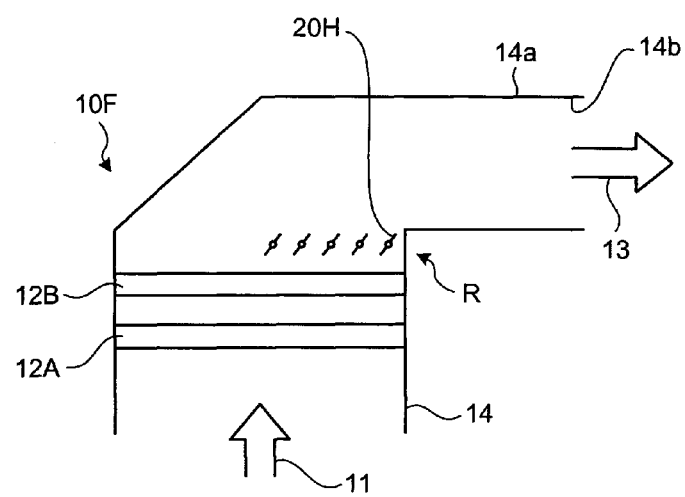
FIG. 8C is a schematic diagram of a modification of the flue gas desulfurization apparatus according to the sixth embodiment.

Further, as shown in FIG. 8C, plural drift suppression members 20H may be arranged locally at the bend portion R, for example, within an area of approximately 50% of the bend portion R from the side of the inside corner.

In the sixth embodiment, the drift suppression member 20H is arranged at the downstream side of the mist eliminator 12B and immediately before the bend portion R bends, whereby the suppression effect can be enhanced.

Since the drift suppression members 20H are arranged at the side of the inside corner where the flow rate is high at the downstream side of the mist eliminator 12B in the sixth embodiment, the pressure drop can be made to suppress the drift.

Here, the opening ratio of the drift suppression member 20H can be determined according to the strength of a drift. For example, the opening ratio can be approximately 20% to 50%.

Thus, with the arrangement of the drift suppression member 20H, the drift of the purified gas 13 can be suppressed and the distribution of flow rate of the purified gas 13 can be adjusted within the predetermined performance range of the mist eliminators 12A and 12B, whereby the amount of dispersing mist to the outside can be significantly reduced.

As a result, the section area of the opening 14b of the exhaust passage 14a which serves to lead the purified gas 13 to the stack for discharge can be reduced from that of a conventional apparatus, represented as 100%, to 65% to 90%. Thus, a part of the elements of the desulfurization apparatus can be made lighter, whereby a cost can be reduced.

Further, in the sixth embodiment, the mist sensor (not shown) is provided so that the opening ratio of the drift suppression member 20H can be adjusted.

Specifically, the opening ratio is adjusted so that the pressure drop increases as the amount of mist detected by the mist sensor increases.

Seventh Embodiment

A flue gas desulfurization apparatus according to a seventh embodiment of the present invention will be described with reference to the accompanying drawings.

Figure 9A:
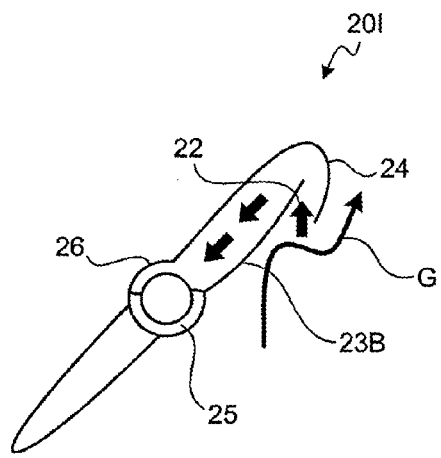
FIG. 9A is a schematic diagram of a drift suppression member according to a seventh embodiment.

FIG. 9A is a schematic diagram of a drift suppression member according to the seventh embodiment. A configuration of the flue gas desulfurization apparatus of the seventh embodiment is the same as that of the first embodiment, and hence, not specifically shown.

As shown in FIG. 9A, a drift suppression member 20I according to the seventh embodiment includes a hollow collecting vane 23B and a mist reservoir 26 which stores mist water 25, which is a condensed mist flow 22 flowing into the collecting vane 23B through an open collecting portion 24.

Figure 9B:
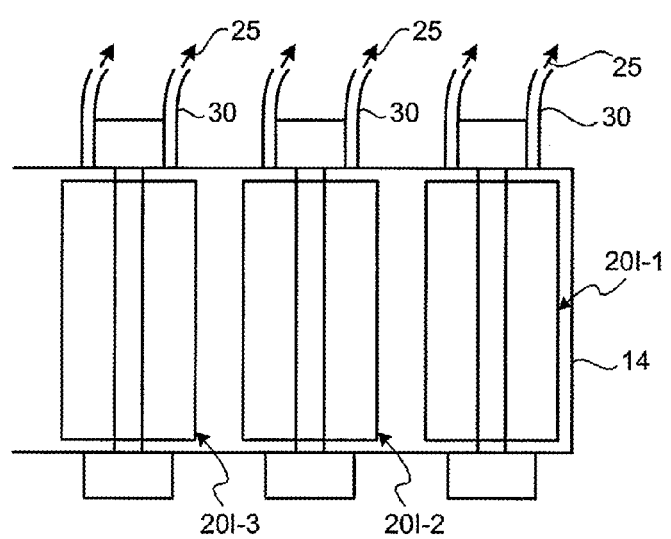
FIG. 9B is a diagram showing how mist water is discharged according to the seventh embodiment.

FIG. 9B shows how the mist water 25 stored in the mist reservoirs 26 formed in the plural drift suppression members 20I is discharged through discharge pipes 30. In FIG. 9B, only three drift suppression members 20I-1 to 20I-3 are shown, and other drift suppression members are not specifically shown. With the configuration as described above, the mist water 25 can be efficiently discharged outside the absorption tower 14.

Eighth Embodiment

A flue gas desulfurization apparatus according to an eighth embodiment of the present invention will be described with reference to the accompanying drawings.

Figure 10A:
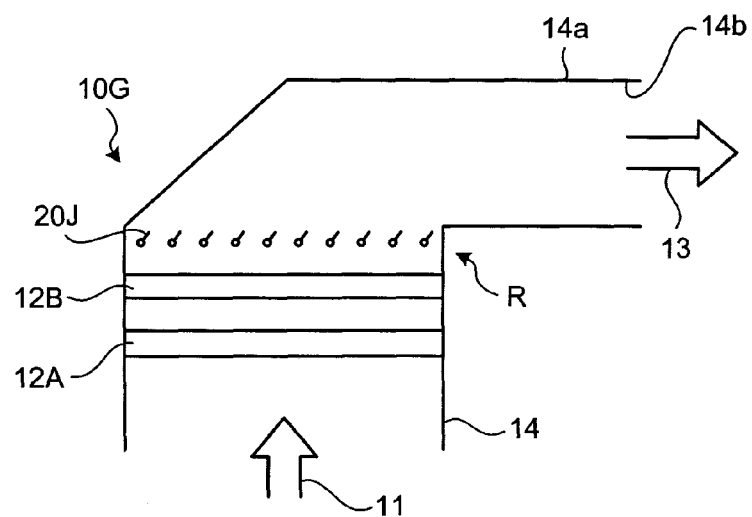
FIG. 10A is a schematic diagram of a flue gas desulfurization apparatus according to an eighth embodiment.

FIG. 10A is a schematic diagram of a main portion of the flue gas desulfurization apparatus according to the eighth embodiment.

As shown in FIG. 10A, a flue gas desulfurization apparatus 10G of the eighth embodiment is a flue gas desulfurization apparatus including a modification of the drift suppression member 20I of the seventh embodiment.

Figure 10B:
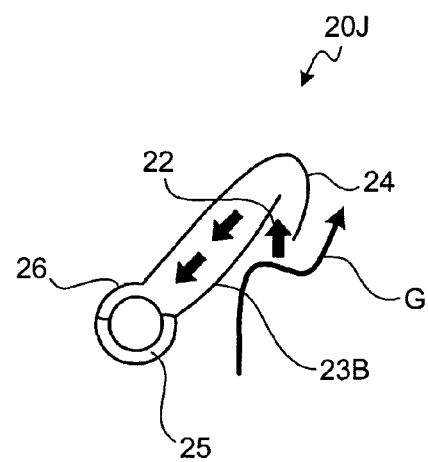
FIG. 10B is a schematic diagram of a drift suppression member according to the eighth embodiment.

As shown in FIG. 10B, in a drift suppression member 20J of the eighth embodiment, the vane at the lower side of the drift suppression member 20I of the seventh embodiment is removed. Thus, the elements of the apparatus can be simplified.

Figure 10C:
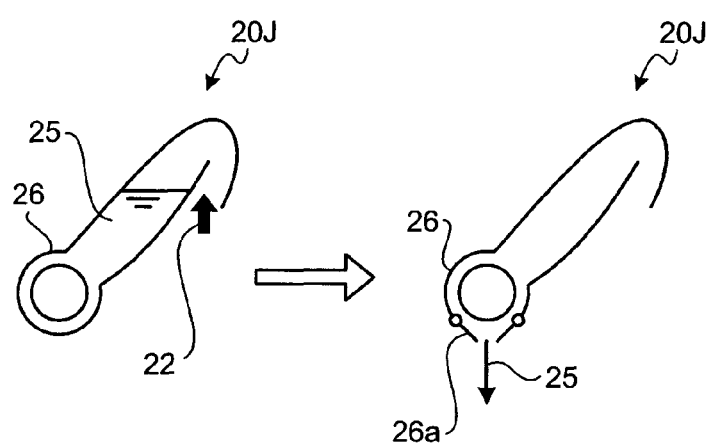
FIG. 10C is a diagram schematically showing how mist water is discharged according to the eighth embodiment.

Further, FIG. 10C shows how the mist water 25 is discharged. An opening/closing member 26a for discharging the mist water 25 is formed in the mist reservoir 26 so that the mist water 25 is discharged toward the inside of the absorption tower 14.

Ninth Embodiment

A flue gas desulfurization apparatus according to a ninth embodiment of the present invention will be described with reference to the accompanying drawings.

Figure 11A:
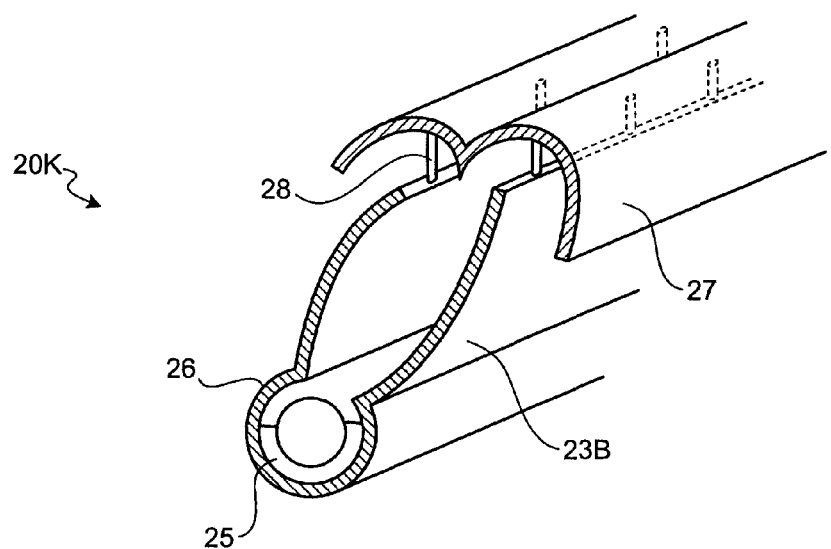
FIG. 11A is a perspective view of a drift suppression member according to a ninth embodiment.

FIG. 11A is a schematic diagram of a drift suppression member according to the ninth embodiment. A configuration of the flue gas desulfurization apparatus of the ninth embodiment is the same as that of the third embodiment, and hence, not specifically shown.

As shown in FIG. 11A, a drift suppression member 20K of the ninth embodiment includes an umbrella-like collecting plate 27 having two ceilings and supported by a supporting member 28 on the collecting vane (cavity) 23B.

Figure 11B:
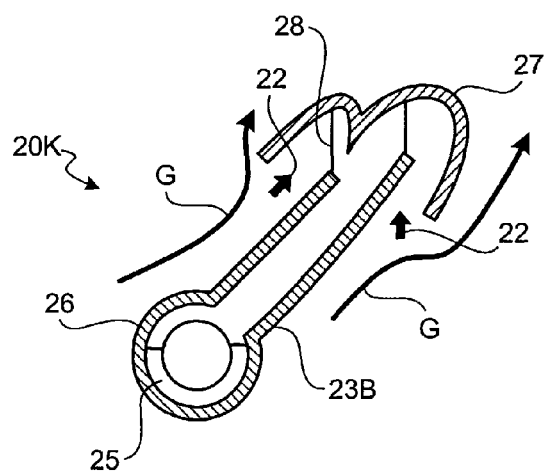
FIG. 11B is a schematic diagram of the drift suppression member according to the ninth embodiment.

As shown in FIG. 11B, as the gas flow G flows along two sides, i.e., an upper side and a lower side of the collecting vane 23B, the accompanying mist flows 22 hit the umbrella-like collecting plate 27 due to inertia force and are collected in the mist reservoir 26 which is a cavity in the collecting vane 23B. Thus, the efficient mist collecting can be realized.

Tenth Embodiment

A flue gas desulfurization apparatus according to a tenth embodiment of the present invention will be described with reference to the accompanying drawings.

Figure 12A:
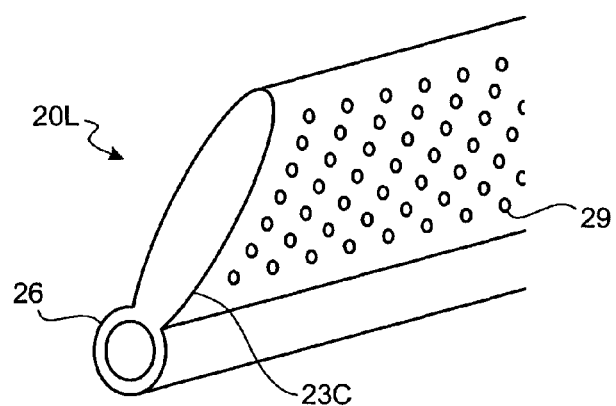
FIG. 12A is a perspective view of a drift suppression member according to a tenth embodiment.

FIG. 12A is a schematic diagram of a drift suppression member according to the tenth embodiment. A configuration of the flue gas desulfurization apparatus according to the tenth embodiment is the same as that of the eighth embodiment, and hence not specifically shown.

As shown in FIG. 12A, a drift suppression member 20L of the tenth embodiment has plural small holes 29 in a hollow collecting vane 23C.

Figure 12B:
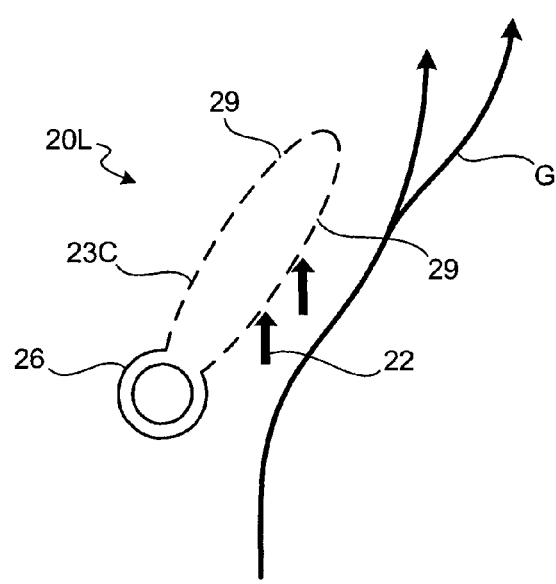
FIG. 12B is a schematic diagram of a drift suppression member according to the tenth embodiment.

As shown in FIG. 12B, the mist flow 22 of the purified gas advances straight due to inertia force and enters into the collecting vane 23C through the small holes 29 and is collected in the collecting vane 23C as the mist water.

The open collecting portion 24 of the seventh embodiment and the collecting plate 27 of the ninth embodiment may be combined with the tenth embodiment.

In the description of the present invention, various drift suppression members are described. The apparatus of the present invention may include only one type of the drift suppression member, or plural types of the drift suppression members.

Further, the flue gas desulfurization apparatus is not limited to those using jet slurry as shown in FIG. 13. Any flue gas desulfurization apparatus can be employed in the present invention.

INDUSTRIAL APPLICABILITY

As can be seen from the foregoing, the flue gas desulfurization apparatus according to the present invention can improve the mist collecting efficiency and suppress the drift, and hence is suitable for the use in flue gas purifying technologies.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A flue gas desulfurization apparatus comprising:
an absorption tower that absorbs sulfur oxide in a flue gas; and
drift suppression members that are arranged near a bend portion of a purified gas exhaust passage arranged at an outlet portion of the absorption tower, the drift suppression members serving to collect mist particles, wherein
the drift suppression members are resisting members, and
the resisting members are arranged at a downstream side of a mist eliminator immediately before the purified flue gas reaches the bend portion, at an upstream side of the bend portion, and at a side of an inside corner of the bend portion.

2. A flue gas desulfurization apparatus comprising:
an absorption tower that absorbs sulfur oxide in a flue gas; and
drift suppression members that are arranged near a bend portion of a purified gas exhaust passage arranged at an outlet portion of the absorption tower, the drift suppression members serving to collect mist particles, wherein
the drift suppression members are resisting members, and
the resisting members are formed as laminated members each including two portions, and at least one of the two portions is slidable against another portion of the two portions.

3. The flue gas desulfurization apparatus according to claim 1 or 2, wherein
the drift suppression members are resisting members, and the resisting members have sectional shapes of at least one of a round shape, rectangular shape, H-shape, I-shape, L-shape, and a semicircular-arch-like shape.

4. A flue gas desulfurization apparatus comprising:
an absorption tower that absorbs sulfur oxide in a flue gas; and
drift suppression members that are arranged near a bend portion of a purified gas exhaust passage arranged at an outlet portion of the absorption tower, the drift suppression members serving to collect mist particles;
wherein the drift suppression member has plural small holes for collecting a mist, and a cavity and a mist reservoir for collecting mist water.

5. A flue gas desulfurization apparatus comprising:
an absorption tower that absorbs sulfur oxide in a flue gas; and
drift suppression members that are arranged near a bend portion of a purified gas exhaust passage arranged at an outlet portion of the absorption tower, the drift suppression members serving to collect mist particles;
wherein the drift suppression member is a damper member having a vane at least on one side.

6. The flue gas desulfurization apparatus according to any one of claims 1, 2, 4 and 5,
wherein the drift suppression member has a mist sensor for measuring a mist in a purified gas.

7. The flue gas desulfurization apparatus according to any one of claims 1, 2, 4 and 5, further comprising
a mist sensor that is arranged inside the purified gas exhaust passage to measure a mist in the purified gas.

* * * * *